US009763555B2

(12) United States Patent
Kan et al.

(10) Patent No.: US 9,763,555 B2
(45) Date of Patent: Sep. 19, 2017

(54) DISHWASHER WITH IMPROVED DRYING PERFORMANCE

(71) Applicant: ARCELIK ANONIM SIRKETI, Istanbul (TR)

(72) Inventors: Ugur Kan, Istanbul (TR); Orhan Atabey, Istanbul (TR); Gokhan Ak, Istanbul (TR); Songul Bayraktar, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days.

(21) Appl. No.: 14/889,826

(22) PCT Filed: Apr. 21, 2014

(86) PCT No.: PCT/EP2014/058038
§ 371 (c)(1),
(2) Date: Nov. 6, 2015

(87) PCT Pub. No.: WO2014/180648
PCT Pub. Date: Nov. 13, 2014

(65) Prior Publication Data
US 2016/0106298 A1    Apr. 21, 2016

(30) Foreign Application Priority Data
May 6, 2013   (TR) .............................. A 2013/05371

(51) Int. Cl.
*A47L 15/48*   (2006.01)
(52) U.S. Cl.
CPC .................................. *A47L 15/488* (2013.01)
(58) Field of Classification Search
None
See application file for complete search history.

(56) References Cited

U.S. PATENT DOCUMENTS

| | | | |
|---|---|---|---|
| 3,026,628 A | | 3/1962 | Berger, Sr. et al. |
| 4,247,158 A | * | 1/1981 | Quayle ................. A47L 15/488 |
| | | | 134/200 |

(Continued)

FOREIGN PATENT DOCUMENTS

| | | |
|---|---|---|
| DE | 3418304 A1 | 11/1985 |
| EP | 0521815 A1 | 1/1993 |

(Continued)

OTHER PUBLICATIONS

International Search Report of PCT/EP2014/058038 and references cited therein.

(Continued)

*Primary Examiner* — Michael Barr
*Assistant Examiner* — Cristi Tate-Sims
(74) *Attorney, Agent, or Firm* — Kilpatrick Townsend & Stockton LLP

(57) ABSTRACT

The present invention relates to a dishwasher (1) comprising a tub (2) wherein the washing items are washed, rinsed and dried, a fan (4) that enables the hot and humid air to be sucked from a suction channel (3) opening into the tub (2) during the drying process and to be mixed with the dry air from the outside environment in a certain ratio, an outlet port (5) that directs the air blown by the fan (4), a discharge channel (6) that is connected to the outlet port (5) of the fan (4) and that enables the air blown by the outlet port (5) of the fan (4) to be delivered to the outside environment, and a return channel (7) that enables the air blown by the outlet port (5) to be redelivered into the tub (2).

14 Claims, 3 Drawing Sheets

(56) References Cited

U.S. PATENT DOCUMENTS

| | | | |
|---|---|---|---|
| 2006/0090778 A1* | 5/2006 | Oakes | A47L 15/4257 134/56 D |
| 2008/0264458 A1* | 10/2008 | Berner | A47L 15/483 134/57 D |
| 2009/0095330 A1 | 4/2009 | Iwanaga et al. | |
| 2010/0071725 A1 | 3/2010 | Peukert et al. | |
| 2010/0139714 A1* | 6/2010 | Alessandrelli | A47L 15/488 134/105 |
| 2014/0150286 A1* | 6/2014 | Jadhav | A47L 15/0034 34/443 |

FOREIGN PATENT DOCUMENTS

| | | | |
|---|---|---|---|
| EP | 1825800 A2 | 8/2007 | |
| EP | 2332457 A1 | 6/2011 | |
| WO | 03059142 A1 | 7/2003 | |

OTHER PUBLICATIONS

Written Opinion of PCT/EP2014/058038 and references cited therein.

\* cited by examiner

DISHWASHER WITH IMPROVED DRYING PERFORMANCE

The present invention relates to a dishwasher that enables the washing items to be washed, rinsed and dried.

The dishwashers enable the washing items, for example kitchenware, placed into the tub, to undergo washing, rinsing and drying processes respectively during a standard washing cycle. The washing items are washed by using detergent in the main washing process. In the rinsing process, the washing items are cleansed of detergent residues. The rinsing process is generally realized in two phases. In the first phase, the washing items are rinsed with cold water and in the second phase with hot water. The drying process is realized after the rinsing processes. The rinsing process with hot water aids the drying process and decreases the evaporation duration of the water droplets that remain on the washing items.

In order to decrease energy consumption in dishwashers, temperature value is decreased in the hot rinsing process and rinsing is made at a lower temperature compared to the conventional dishwashers; however, decreasing the rinsing temperature decreases the drying performance and water droplets remain on the kitchenware after the washing and drying processes are completed.

In the state of the art International Patent Application No. WO03059142 (A1), a dishwasher is explained wherein the objects are rinsed in two steps, first with cold water and afterwards with hot water.

In the state of the art European Patent Application No. EP2332457(A1), a fan is explained that mixes the hot and humid air inside the chamber with the dry air from the outside during the drying process. The air mixed by the fan is partially redelivered into the chamber by means of a bypass line connected to the fan outlet and is partially discharged to the atmosphere by an air outlet line again connected to the fan outlet.

In the state of the art United States Patent Application No. US2010071725 (A1), a dishwasher is explained wherein the washware are rinsed at low temperatures.

The aim of the present invention is the realization of a dishwasher which enables the washing items to be dried effectively and prevents the energy consumption increase.

The dishwasher realized in order to attain the aim of the present invention, and explicated in the attached claims, comprises a guiding means that guides the air sucked from the tub and the outside environment and mixed by the fan, that is operated in the drying process, to the discharge channel that opens to the outside environment or to a return channel that opens into the tub. The hot and humid air sucked from the tub is mixed with the outside environment air by the fan and blown through an outlet port. The guiding means disposed at the outlet port guides the blown air to the outside environment by means of the discharge channel or redelivers to the tub by means of the return channel providing the continuation of its circulation depending on drying conditions, for example the temperature and/or humidity value of the air sucked from the tub.

In an embodiment of the present invention, a valve is used in the guiding means which enables the opening/closing of the discharge and return channels. Alternatively, a valve system can be used.

In an embodiment of the present invention, the valve is actuated by a motor.

In another embodiment of the present invention, the valve is actuated by a thermal pusher and a gear mechanism or a crankshaft-piston rod mechanism that operate depending on the temperature of the circulated air.

In another embodiment of the present invention, the guiding means guides the air according to data received from the temperature and/or humidity sensors depending on the humidity and/or the temperature of the air mixed by the fan.

In another embodiment of the present invention, it is not required to use humidity and temperature sensors. The air discharge time (tdischarge) and the circulation time (tcirculate) are predetermined so as to obtain a suitable drying performance and saved in the memory of the main control unit and the guiding means guides the air in a time dependent manner.

In another embodiment of the present invention, cooling surfaces are arranged inside the suction channel in order to provide condensation of the circulated air. Furthermore, a drainage channel is formed at the lower side of the suction channel which enables the collected condensation water to be discharged outside.

By means of the present invention, high drying performance can be attained at low drying temperature. After the hot water rinsing process, the hot and humid air generated inside the machine is first discharged outside from the machine by a discharge channel and afterwards is circulated inside the tub by means of the return channel, thus the drying performance is enhanced and high energy consumption is prevented. Furthermore, the problems of wetting and rusting that may occur on the inner and outer surfaces of the machine due to the vapor generated inside the dishwasher being dispersed uncontrollably from various parts of the machine to the environment are eliminated.

The model embodiments relating to the dishwasher realized in order to attain the aim of the present invention are illustrated in the attached figures, where:

Figure 1:
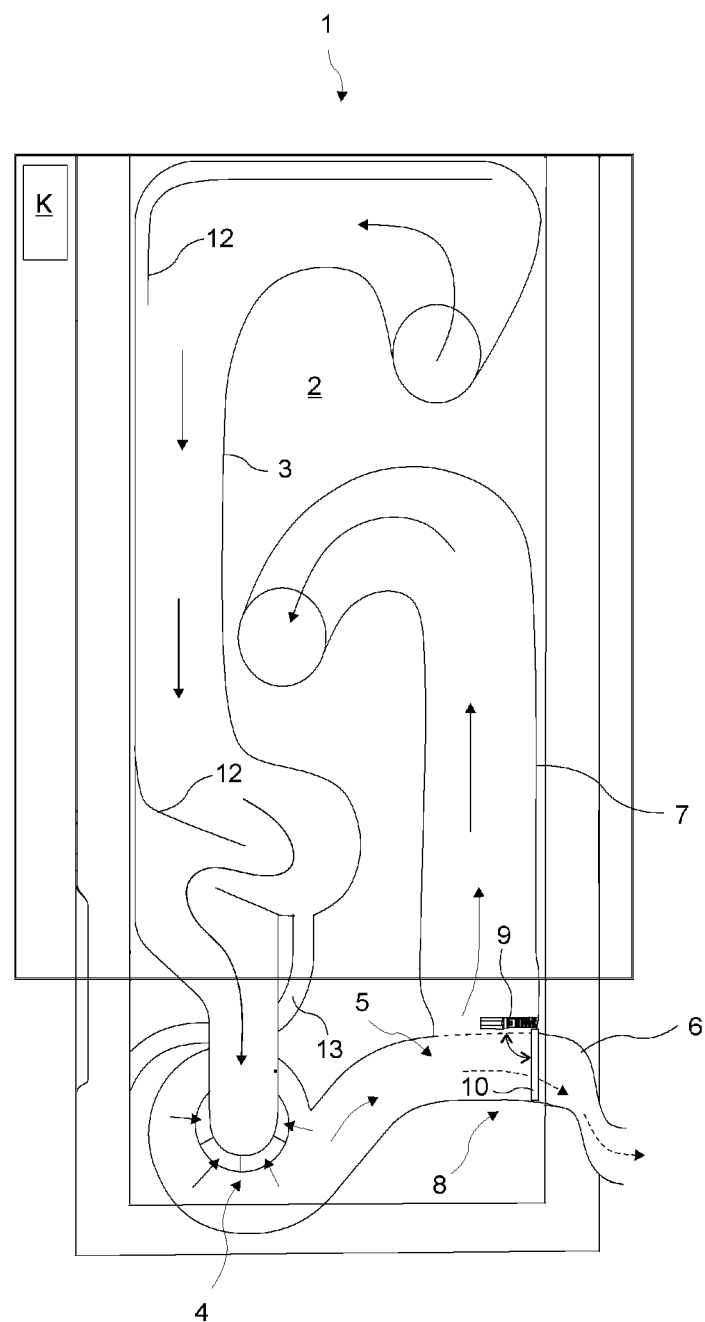
FIG. 1 is the schematic view of a dishwasher and the flow paths of the air sucked by the fan from the tub and the outside environment in the drying process. The solid arrows show the flow path of the circulated air and the air sucked from the outside environment, and the dashed arrows show the flow path of the air discharged outside.

1. Dishwasher
2. Tub
3. Suction channel
4. Fan
5. Outlet port
6. Discharge channel
7. Return channel
8. Guiding means
9. Actuation mechanism
10. Valve
11. Thermal pusher
12. Cooling surface
13. Drainage channel The dishwasher (1) comprises a tub (2) wherein the washing items are washed, rinsed and dried, a fan (4) that enables the hot and humid air to be sucked from a suction channel (3) opening into the tub (2) during the drying process and to be mixed with the dry air from the outside environment in a certain ratio, an outlet port (5) that guides the air blown by the fan (4), a discharge channel (6) that is connected to the outlet port (5) of the fan (4) and that enables the air blown by the fan (4) to be delivered to the outside environment, and a return channel (7) that is also connected to the outlet port (5) of the fan (4) and that enables the air blown by the fan (4) to be redelivered into the tub (2). The discharge channel (6) and the return channel (7) split into two by branching out from the outlet port (5). The discharge channel (6) opens directly to the outer environment and the return channel (7) opens to the tub (2) (FIG. 1).

The dishwasher (1) of the present invention comprises a guiding means (8),
  that is positioned at the outlet port (5) of the fan (4),
  that enables the air sucked from the tub (2) by means of the suction channel (3) and directly from the outside environment by the fan (4) and blown from the outlet port (5) to be discharged to the outside environment by guiding it to the discharge channel (6) or
  that enables the air mixed and blown from the outlet port (5) by the fan (4) to be redelivered into the tub (2) by guiding it to the return channel (7).

Figure 2:
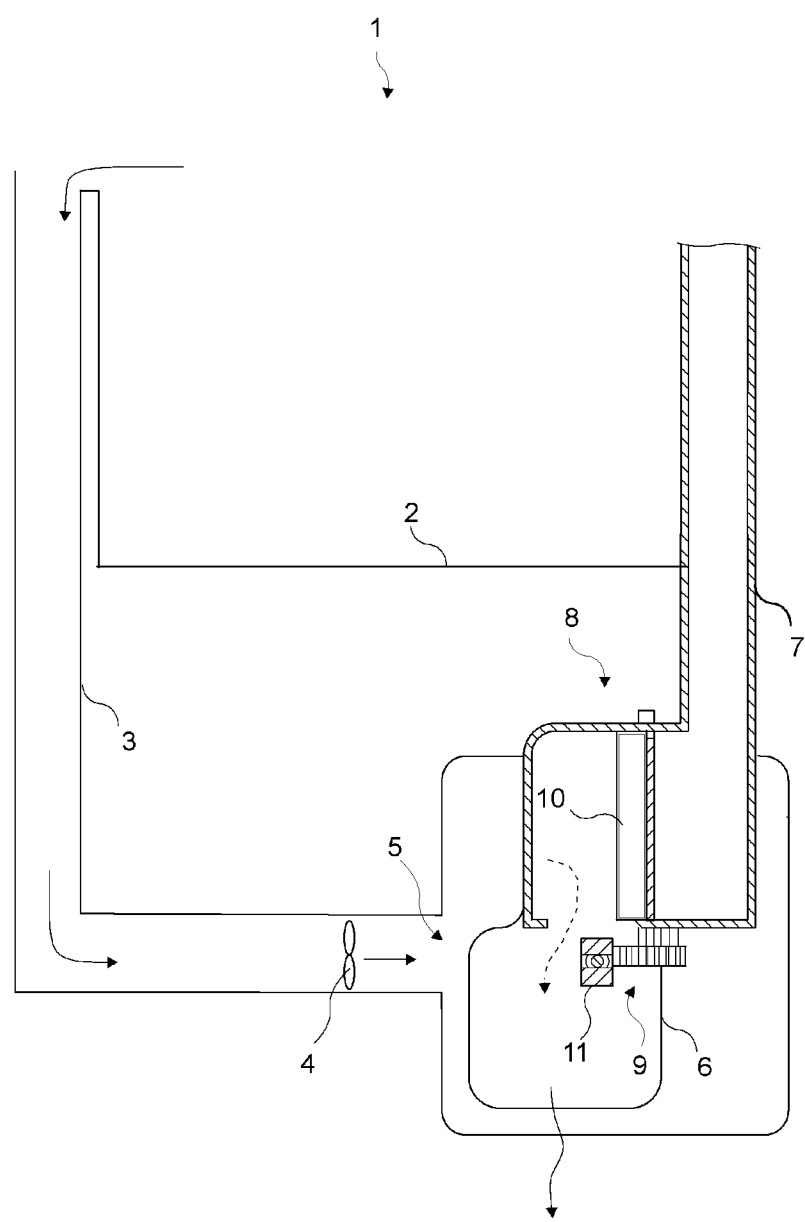
FIG. 2 is the partial schematic view of the dishwasher and the guiding means while the exterior and interior air sucked and mixed by the fan is guided to the discharge channel.

In the dishwasher (1) of the present invention, the fan (4) sucks air from the tub (2) by means of the suction channel (3) and furthermore directly sucks air from the outside environment, then mixes these two types of air and blows it through the outlet port (5). The guiding means (8) is controlled by the main control unit (K) that controls the washing, drying processes in the dishwasher (1) and delivers the air sucked from the outside environment and the tub (2), mixed together and blown by the fan (4) to the outside environment by opening the discharge channel (6) or into the tub (2) by opening the return channel (7) or partially to the outside, partially to the tub (2) by opening both the discharge channel (6) and the return channel (7) depending on the conditions of the drying process (FIG. 1, FIG. 2).

Figure 3:
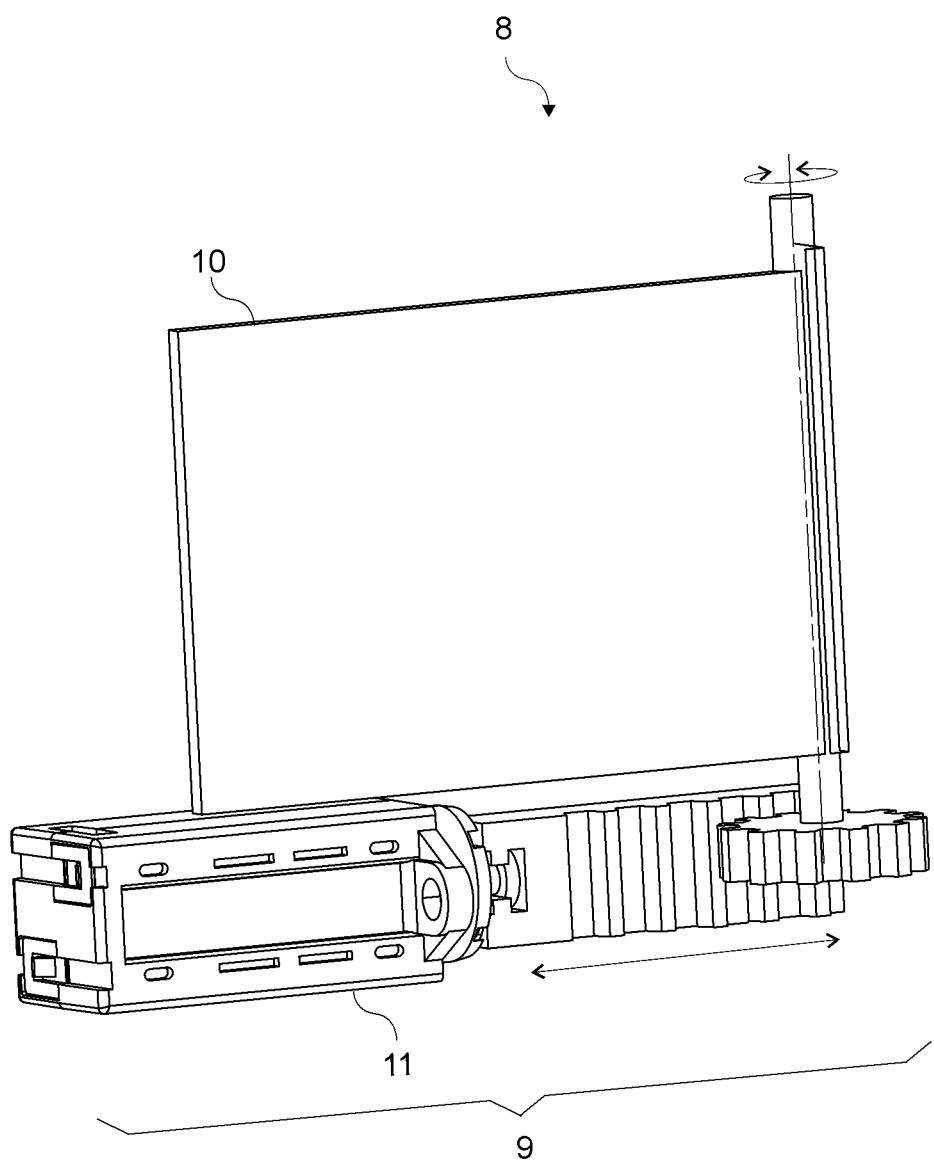
FIG. 3 is the perspective view of the guiding means used in the dishwasher in an embodiment of the present invention.

In an embodiment of the present invention, the guiding means (8) comprises an actuation mechanism (9) and a valve (10) that can be changed to two different positions by being rotated by the actuation mechanism (9) (FIG. 3). The valve (10), when in the first position, enables the air blown from the fan (4) outlet port (5) to be guided to the tub (2) by closing the discharge channel (6) and opening the return channel (7). The valve (10), when in the second position, enables the air blown from the fan (4) outlet port (5) to be guided to the discharge channel (6) by closing the return channel (7) and opening the discharge channel (6) (FIG. 1 and FIG. 2). Both the discharge channel (6) and the return channel (7) are enabled to be opened/closed by a single valve (10).

In an embodiment of the present invention, the guiding means (8) directs the air to the discharge channel (6) or the return channel (7) depending on the humidity and/or the temperature of the air inside the tub (2) or the outlet port (5) of the fan (4). In this embodiment of the present invention, the time period the air is discharged to the outside environment (tdischarge) and afterwards the time period the air is circulated (tcirculate) through the suction channel (3), the fan (4) and the return channel (7) are determined depending on the humidity and/or the temperature of air detected by the temperature and/or the humidity sensors (not shown in the figures) disposed at the tub (2) or the fan (4) outlet port (5), and the main control unit (K), for example a microcontroller, that regulates the washing/drying processes in the dishwasher (1) controls the guiding means (8) with respect to the data received from the sensors.

In another embodiment of the present invention, the actuation mechanism (9) comprises an electric motor that enables the valve (10) to be rotated around its axis and a cam and a micro switch (not shown in the figures) that enables the position of the valve (10) to be detected. The electric motor is driven by the main control unit (K) in accordance with data received from the temperature and/or humidity sensors. The electric motor is driven in one direction, for example at a temperature higher than a certain value, and driven in the opposite direction at a temperature lower than a certain value, and thus the valve (10) is enabled to open/close the discharge channel (6) or the return channel (7).

In an embodiment of the present invention, the actuation mechanism (9) comprises a thermal pusher (11) (FIG. 2, FIG. 3). The actuation mechanism (9) converts the linear movement generated by the thermal pusher (11) into circular movement and enables the valve (10) to be changed to the first or the second position by rotating around its axis. When the temperature of air blown from the fan (4) outlet port (5) exceeds a certain value, the thermal pusher (11) selected depending on the said temperature value is activated, opening the discharge channel (6) and closing the return channel (7) thus enabling the air to be discharged to the outside environment. When the temperature of air blown from the fan (4) outlet port (5) falls below a certain value, the thermal pusher (11) enables the air to be circulated through the return channel (7), the tub (2), the suction channel (3) and the fan (4) by closing the discharge channel (6) and opening the return channel (7).

In another embodiment of the present invention, it is not required to use humidity and/or temperature sensors. The time period the air blown from the fan (4) outlet port (5) is discharged (tdischarge) by being guided to the discharge channel (6) and the time period the air is circulated (tcirculate) by being guided to the return channel (7) are predetermined by the manufacturer so that a suitable drying performance is maintained and corresponding time periods saved in the memory of the main control unit (K). In this embodiment of the present invention, the guiding means (8) enables the air mixed by the fan (4) during the drying process to be first guided to the discharge channel (6) for a certain time period (tdischarge) and directly discharged outside and afterwards to be guided to the return channel (7) for a certain time period (tcirculate) in order to be circulated and to be redelivered to the tub (2). In this embodiment of the present invention, after the drying process performed by hot water, the relative humidity inside the tub (2) is lowered by discharging some of the hot and humid in the tub (2) to the outside environment by means of the fan (4) and the guiding means (8). Afterwards, the hot and humid air in the tub (2) is mixed with the dry air from the outside environment by the fan (4) and the guiding means (8) and circulated through the return channel (7), the tub (2), the suction channel (3) and the fan (4) thereby quickly drying the washing items in the tub (2). The air is circulated by operating the fan (4) until the washing items are dry.

In another embodiment of the present invention, the dishwasher (1) comprises one or more than one cooling surface (12) that is arranged inside the suction channel (3) and that enables the hot and humid air sucked from the suction channel (3) by the fan (4) during the drying process to be condensed, and a drainage channel (13) that opens outside from the suction channel (3) and enables the condensed water to be discharged outside from the suction channel (3) (FIG. 1). Accordingly, the drying performance of the circulated air is increased.

By means of the present invention, during the drying process performed in the dishwasher (1), the air having low temperature and low relative humidity (unsaturated) that is guided from the return channel (7) into the tub (2) and circulated by being sucked again from the suction channel (3) by the fan (4), moves the air inside the tub (2), decreasing pressure inside the tub (2), providing the collection of the moisture remaining on the washing items and the condensation of the collected moisture on the (cold) interior surface of the dishwasher (1) and inside the suction channel (3). Consequently, high drying performance is attained at low temperatures. Furthermore, after the rinsing process performed with hot water, some of the hot and humid air inside the tub (2) is directly discharged to the outside environment by the fan (4), thereby decreasing the relative humidity of the air inside the tub (2), shortening the drying duration and providing energy saving. Problems like the vapor generated inside the dishwasher (1) being dispersed to the outside environment uncontrollably, wetting of the exterior surface of the dishwasher (1) and rust formation are eliminated.

The invention claimed is:

1. A dishwasher (1), comprising:
   a tub (2) wherein washing items are washed, rinsed and dried;
   a fan (4) enables hot and humid air to be sucked through a suction channel (3) that opens into the tub (2) during a drying process and to be mixed with dry air from the outside environment in a certain ratio;
   an outlet port (5) that guides the air blown by the fan (4);
   a discharge channel (6) that is connected to the outlet port (5) and that enables the air blown by the fan (4) to be delivered to the outside environment;
   a return channel (7) that is connected to the outlet port (5) and that enables the air blown by the fan (4) to be redelivered into the tub (2); and
   a guiding means (8) positioned at the outlet port (5) that enables the air sucked from the suction channel (3) and from the outside environment, and blown from the outlet port (5) by the fan (4), to be discharged directly to the outside environment, the guiding means (8) being configured to guide the air to the discharge channel (6) or to the return channel (7), to be redelivered into the tub (2), depending on a humidity or a temperature of the air.

2. The dishwasher (1) as in claim 1, wherein the guiding means (8) has an actuation mechanism (9) and a valve (10) that can be changed to two different positions by being rotated by the actuation mechanism (9), which when in the first position, enables the air blown from the outlet port (5) to be guided to the return channel (7) by closing the discharge channel (6) and opening the return channel (7) and when in the second position, enables the air blown from the outlet port (5) to be guided to the discharge channel (6) by closing the return channel (7) and opening the discharge channel (6).

3. The dishwasher (1) as in claim 2, wherein the actuation mechanism (9) has an electric motor that enables the valve (10) to be rotated around its axis, and also has a cam and a micro switch that enables the position of the valve (10) to be detected.

4. The dishwasher (1) as in claim 2, wherein the actuation mechanism (9) has a thermal pusher (11) that enables the valve (10) to be changed to the first or the second position by rotating around its axis by converting the linear movement generated by the thermal pusher (11) into circular movement.

5. The dishwasher (1) as in claim 1, wherein the guiding means (8) enables the air mixed by the fan (4) during the drying process to be first directed to the discharge channel (6) for a certain time period (tdischarge) and to be directly discharged to the outside environment and afterwards to be guided to the return channel (7) for a certain time period (tcirculate) in order to be circulated and to be redelivered to the tub (2).

6. The dishwasher (1) as in claim 1, further comprising one or more than one cooling surface (12) arranged inside the suction channel (3) that enables the hot and humid air sucked thereinto by the fan (4) during the drying process to be condensed, and a drainage channel (13) that opens outside from the suction channel (3) and that enables the condensed water to be discharged outside.

7. The dishwasher (1) as claim 2, wherein the guiding means (8) enables the air mixed by the fan (4) during the drying process to be first directed to the discharge channel (6) for a certain time period (tdischarge) and to be directly discharged to the outside environment and afterwards to be guided to the return channel (7) for a certain time period (tcirculate) in order to be circulated and to be redelivered to the tub (2).

8. The dishwasher (1) as claim 3, wherein the guiding means (8) enables the air mixed by the fan (4) during the drying process to be first directed to the discharge channel (6) for a certain time period (tdischarge) and to be directly discharged to the outside environment and afterwards to be guided to the return channel (7) for a certain time period (tcirculate) in order to be circulated and to be redelivered to the tub (2).

9. The dishwasher (1) as in claim 2, further comprising one or more than one cooling surface (12) arranged inside the suction channel (3) that enables the hot and humid air sucked thereinto by the fan (4) during the drying process to be condensed, and a drainage channel (13) that opens outside from the suction channel (3) and that enables the condensed water to be discharged outside.

10. The dishwasher (1) as in claim 3, further comprising one or more than one cooling surface (12) arranged inside the suction channel (3) that enables the hot and humid air sucked thereinto by the fan (4) during the drying process to be condensed, and a drainage channel (13) that opens outside from the suction channel (3) and that enables the condensed water to be discharged outside.

11. The dishwasher (1) as in claim 4, further comprising one or more than one cooling surface (12) arranged inside the suction channel (3) that enables the hot and humid air sucked thereinto by the fan (4) during the drying process to be condensed, and a drainage channel (13) that opens outside from the suction channel (3) and that enables the condensed water to be discharged outside.

12. The dishwasher (1) as in claim 5, further comprising one or more than one cooling surface (12) arranged inside the suction channel (3) that enables the hot and humid air sucked thereinto by the fan (4) during the drying process to be condensed, and a drainage channel (13) that opens outside from the suction channel (3) and that enables the condensed water to be discharged outside.

13. The dishwasher (1) as in claim 7, further comprising one or more than one cooling surface (12) arranged inside the suction channel (3) that enables the hot and humid air sucked thereinto by the fan (4) during the drying process to be condensed, and a drainage channel (13) that opens outside from the suction channel (3) and that enables the condensed water to be discharged outside.

14. The dishwasher (1) as in claim 8, further comprising one or more than one cooling surface (12) arranged inside the suction channel (3) that enables the hot and humid air sucked thereinto by the fan (4) during the drying process to be condensed, and a drainage channel (13) that opens outside from the suction channel (3) and that enables the condensed water to be discharged outside.

* * * * *